United States Patent Office 3,232,777
Patented Feb. 1, 1966

3,232,777
CEMENTITIOUS COMPOSITION AND METHOD
OF PREPARATION
Edward G. W. Bush, 3435 Point Grey Road, Vancouver,
British Columbia, Canada
No Drawing. Filed Feb. 4, 1963, Ser. No. 256,103
13 Claims. (Cl. 106—90)

This invention relates to cementitious compositions, such as mortars, grouts, concretes, and the like, and more specifically to a method of preparing these compositions by the addition thereto of small but effective amounts of dispersing or water-reducing agents. Still more specifically, this invention relates to the method of preparing concrete, grouts, and the like by the addition of at least two, and preferably three or more dispersing agents, for the purpose of improving the consistency and increasing the ultimate strength of the cured product by decreasing the amount of water normally required to prepare these compositions.

The science of concrete, etc., goes back as far as the ancient Romans where slaked lime or calcium hydroxide was used as the cementing material. Slaked lime by itself, however, is not effective as a cementitious material in today's concretes, grouts, or mortars, since it has a tendency to absorb carbon dioxide and form a carbonate which is partially soluble in water, slow drying, and provides only moderate strength. To improve on the deficiencies of the very early cements, other materials containing metal silicates, and specifically aluminum silicate, were used in combination with the slaked lime to obtain what is presently known as hydraulic cements. These cements are used today in the preparation of concretes, or similar compositions, which are characterized by being water-resistant, quick hardening, and having superior strength.

With the increasing demand for cementitious products, in the building industry, particularly the massive structures such as buildings, dams, roads, and the like, there is need for ways of improving on the quality of these products without increasing the cost. Of particular importance is the requirement for increased strength, faster drying, and resistance to weather. To improve on these, it is essential to determine the chemistry involved so that to some extent it can be controlled or altered to the point where a better or improved product can be obtained. For example, it is known that the addition of water to cement forms a cementitious paste, which after sufficient time hardens to bind the aggregates and other materials into a homogeneous mass. The exact chemical mechanism of this formation is not completely understood, but a popular theory is that the cement hydrolyzes causing crystallization which interlocks the other ingredients.

It is important, also, to consider the setting or hardening characteristics of a concrete or grout since these materials are placed or poured in their plastic state and would be difficult to handle or work if there should be any quick or false setting. To avoid this, retarders, i.e. gypsum or other types of sulfates, are added to the wet mixture to minimize the water solubility of the aluminates. Ordinarily, the additon of water to cement results in the formation of aluminate crystals, which are responsible for quick setting. In addition to cyrstallization, stiffening or hardening of concrete is still unpredictable since it can be caused by many other factors. Thus, the ingredients of the cement, e.g. percent of water, mixing temperature, type of mixing, kind of aggregate, mixing time, etc., all have an influence on the final characteristics of the cementitious compositons.

For example, large amounts of water are believed to cause crystallization which effects the strength of the composition by reducing the bond between the aggregates and the matrix, causing the concrete to be brittle and crack. It is desirable, therefore, to prepare a cementitious composition with a minimum amount of water or to regulate the water requirement, otherwise known as the water-cement ratio, by maintaining a normal consistency.

One method of determining consistency is based on the depth of penetration of a one-centimeter diameter needle of a Vicat apparatus during a 30-second period. The correct amount of water is determined when the one-centimeter diameter plunger in the standard Vicat apparatus gives a reading of about 35 millimeters 30 seconds after the plunger has been released. Enough water should be added to the mixture to provide this consistency. The amount of water required to produce a sufficient depth of penetration is expressed as a percentage by the weight of the cement, e.g., 24 percent, and is referred to as the normal consistency. The normal consistency test measures the plasticity of the cement which is indicative of its concrete making properties.

Another method of establishing the water requirement for a prescribed consistency is the flow table, which measures the increase in diameter or flow of a mass of concrete, resulting from a definite number of vibrations of the table top.

A preferred method of determining the consistency of the compositions of this invention is the flow cone used by the Corps of Engineers in accordance with specification CRD–C79. It is a metal cone having a capacity of about 1725 ml. with a ½ inch dameter outlet. The time it takes the 1725 ml. of material to flow from the cone is measured in seconds with the standard efflux time being 18.0 seconds ±0.5.

These compositions may be modified further by the addition of silica and alumina containing substances known as pozzolana. These materials in themselves have no cementitious or binding qualities but react with the lime in the presence of water to form cementitious materials which improve the strength of the mixtures. Pozzolanas to be used are materials, such as flyash, silica-containing substances, such as powdered brick, burnt shale and some of the slags. Recently, pozzolana-containing cements have come into general recognition for preparing concretes.

Notwithstanding the amount of time, effort, and research that have gone into improving cementitious grouts, mortars, concretes, and the like, there still is need for methods of preparing these compositions with a minimum amount of water, while maintaining a normal consistency, in order to increase the tensile and compression strength. The dispersing or water-reducing agents, as described hereinafter, provide a means of improving the compositions in this respect. The addition of small but effective amounts of at least two and preferably three dispersants reduces the amount of water normally required, but at the same time retains the standard consistency and improves the ultimate strength.

Accordingly, it is an object of this invention to provide a concrete, mortar, grout, or other cementitious composition containing at least two and preferably three dispersing or water-reducing agents in a quantity effective to reduce the amount of water ordinarily required to prepare a composition having a normal consistency.

It is another object of this invention to provide a cementitious grout or concrete composition containing a small but effective amount of at least two and preferably three dispersing or water-reducing agents, at least one of these agents being selected from the class of non-ionic dispersants and the remainder being selected from the class of anionic and/or cationic dispersants.

It is another object of this invention to provide a concrete or grout composition having improved compressive and tensile strength and containing a small but effective amount of at least two and preferably three dispersing or water-reducing agents selected from the group consisting of nonionic, anionic, and cationic dispersants, at least one of the dispersants being nonionic, and at least one or more being anionic.

It is still another object of this invention to provide a cementitious grout or concrete composition containing a pozzolana having a small but effective amount of at least two and preferably three water-reducing or dispersing agents.

It is a still further object of this invention to provide a grout or concrete composition having improved tensile and compressive strength and at least two, preferably three, water-reducing or dispersing agents, at least one of the water-reducing agents being selected from the nonionic dispersants and the remainder being either an anionic and/or cationic dispersant.

It is a still further object of this invention to provide a method of preparing concretes, grouts, mortars, and similar compositions which comprises the addition of at least two and preferably three water-reducing or dispersing agents in series to reduce the amount of water ordinarily required to obtain a normal consistency and to improve the tensile and compressive strength.

It is a still further object of this invention to provide a method of preparing a grout or concrete composition which comprises adding a small but effective amount of at least two and preferably three water-reducing or dispersing agents in series, with or without pozzolana, to improve the tensile and compressive strength.

It is a still further object of this invention to provide a means of preparing grouts or concrete compositions, with or without pozzolana, having improved strength and a smaller amount of water than that required ordinarily to obtain a mixture of normal consistency.

It is a still further object of this invention to provide a method of reducing the amount of water ordinarily required in preparing a concrete or gout containing pozzolana, by the addition thereto of a small but effective amount of at least two and preferably three water-reducing or dispersing agents, the dispersants being added to the wet mixture in series and being selected from the group consisting of nonionic, anionic, and cationic dispersants.

It is a still further object of this invention to provide a method of preparing concrete or grouting compositions having improved tensile and compressive strengths, by the addition thereto of a small but effective amount of at least two and preferably three water-reducing or dispersing agents at intervals of mixing the ingredients, each of the dispersants being added to the mixture separately with continuous agitation until the required consistency is obtained.

It is a still further object of this invention to provide a method of preparing concrete or grouting compositions having substantially improved tensile and compressive strengths by the addition thereto of at least two and preferably three dispersing agents, at least one being selected from the group consisting of nonionic dispersants and the remainder being either an anionic or cationic dispersant, the dispersants being added to the composition separately or in series at different intervals of mixing to obtain normal consistency with a minimum amount of water.

It is a still further object of this invention to provide a method of preparing grouting compositions having superior strength and being prepared with a smaller amount of water than ordinarily required for compositions of the same consistency, said improvements being realized by the addition to the composition of small but effective amounts of one or more nonionic dispersants and one or more dispersants selected from the group consisting on anionic and cationic dispersants.

These and other objects of the invention will become aparent from a further and more detailed description of the invention to follow.

It has been discovered, quite unexpectedly, that new and improved cementitious compositions can be prepared with a smaller amount of water than ordinarily required, by the addition thereto of an effective amount of at least two and preferably three dispersing or water-reducing agents, said water-reducing agents being selected from the group consisting of nonionic, cationic, and anionic dispersants. One or more dispersants from one or more of these classes is added to the cementitious composition separately or in series with vigorous agitation during the preparation of the mixture. More specifically, it has been discovered that improved grouting and concrete compositions can be prepared by intimately mixing and agitating with cement, water, and aggregate, an effective but small amount of at least two and preferably three dispersing agent wherein one or more of the dispersants is nonionic and is added to the water prior to preparing the wet mixture.

The amount of water to be used in preparing a composition having a normal consistency will vary, but, as discovered here, can be decreased by a considerable amount by adding additional dispersants. As the dispersants are added to the aqueous mixture, the amount of water required is reduced, resulting in an appreciable increase in the ultimate strength of the finished or cured product.

The essential ingredients of the cementitious compositions referred to comprise aproximately 20 to 40 percent by weight of cement, 0 to 20 percent by weight of a pozzolana, 40 to 70 percent by weight of aggregate or mixtures thereof, a small but effective amount of at least two water-reducing or dispersing agents, and the required amount of water to obtain the desired consistency which may range, for example, up to about 25 percent and preferably 10 to 20 percent. The water-reducing agent utilized should be at least one nonionic dispersant and at least one or more anionic and/or cationic dispersant. That is, to obtain the most effective results, it is essential that the nonionic dispersant be suplemented by a subsequent addition of either one or more cationic and/or anionic dispersants so as to minimize substantially the amount of water normally required and thus improve the properties of the final product. It is known, for example, that for a given mixture of cement and aggregate, the strength of the concrete is a function of the ratio of the cement to free water in the plastic or wet state but it was unexpected to find that by adding the water-reducing agents, as described herein, the amount of water could be reduced without sacrificing consistency.

The grouts, cements, or pozzolana-containing concretes, and the like, are prepared from cement, such as Portland cement, which is essentially a calcium-aluminum-magnesium-silicate which can be prepared by igniting mixtures containing calcium carbonates and aluminum silicates. In addition, blast furnace slag can be used. The slag usually is mixed with prescribed amounts of limestone, then converted to cement. Most of the blast furnace slags contain approximately 50 percent lime, 27 to 30 percent silica, 10 to 12 percent alumina, 3 percent magnesium oxide, and small amounts of iron oxide. Typical Portland cement, similar to blast furnace cement, consists essentially of the following:

| | Percent by weight |
|---|---|
| CaO | 60–67 |
| $SiO_2$ | 17–25 |
| $Al_2O_3$ | 3–8 |
| $Fe_2O_3$ | 0.5–6.0 |
| MgO | 0.1–5.5 |
| $Na_2O + K_2O$ | 0.5–1.3 |
| $SO_3$ | 1–3 |

The lime or calcium oxide is an essential component and is derived mostly from the decomposition of calcium carbonate. Upon adding water to the cement, the calcium oxide is converted to hydroxide and as hydration continues, a point is reached where the mixture becomes supersaturated with hydrated products which coagulate around the cement particles, causing the mixture to harden.

Modifying materials, such as pozzolanas, may be used with the cement. They are siliceous and aluminum containing materials, such as naturally-occurring clay and shale, e.g., diatomaceous earth, pumicite, slag, volcanic ash, burnt shale, silicas, silica fume, powdered brick, and particularly flyash, which is a flue dust product resulting from the combustion products of pulverized coal. These materials may be used in ranging from about 0–50 percent by weight of the cement or in the range of 0 to 20 percent by weight of the total composition.

The aggregates will vary in particle size and proportion, depending upon the type of mixture being prepared. Most of the aggregates used in concrete or similar mixtures include natural sand and gravel because of their wide distribution and availability. Other aggregates include crushed stone, manufactured sand, blast furnace slags, and some of the lightweight aggregates, e.g., pumice, volcanic cinders, expanded shales, clays, slates, or any mixtures thereof. The relative proportion of aggregates may range from about 40 to 70 percent by weight of the composition and will vary depending upon the type of aggregates and the ultimate use of the product.

Accordingly, then, it has been discovered that these cementitious compositions can be prepared in a prescribed manner without the amount of water ordinarily thought to be required. It has been found that by adding to the concrete or grout, a specific type of water-reducing or dispersing agent, in a series of admixing steps that the ultimate strength and other physical characteristics of the concrete can be improved.

While it has been recognized that the properties of a finished cementitious product depend on many factors, e.g. the presence of alkali materials, the size, weight, kind, and relative proportions of the ingredients, the present invention takes these into consideration and goes further by adding to the mixture a plurality of water-reducing or dispersing agents. It has been found that by using at least two, and preferably three dispersants, wherein at least one is a non-ionic material and the remainder selected from the group consisting of anionic, cationic, and mixtures thereof, concretes and similar compositions can be prepared with smaller amounts of water.

It has been discovered that by adding to a grout, for example, in series, a nonionic dispersant followed by the addition of at least one anionic, or a combination of cationic and anionic dispersants, the normal consistency of the mixture could be maintained with lower water content. The type and concentration of the dispersants will vary depending upon the ingredients of the composition, but in any event the normal consistency can be maintained with a much smaller amount of water by using, for example, a nonionic dispersant followed by the separate addition of two anionic dispersants with thorough agitation. In order to obtain these improvements, however, it is essential to add each of the dispersants in accordance with the method described, separately, in a series of steps and not as a combination. In those instances where more than one of the dispersants was added to the mixture together rather than separately, no appreciable improvement was noted and the effect was similar to the addition of only one rather than two dispersants.

Thus, it was unexpected to find that upon adding the dispersants in this particular manner, e.g. in series, the amount of water could be reduced, and as further additions of dispersants were made the ultimate strength of the concrete was increased. Typical examples showing the amount of water reduction are illustrated in the following table:

TABLE I

| Examples | I | II | III | IV |
| --- | --- | --- | --- | --- |
| Components: | | | | |
| Nonionic dispersant (lower aliphatic substituted butyne diol) | | | X | X |
| Anionic dispersant (alkyl aryl sodium sulfonate) | | | | X |
| Sodium salt of ligno-sulfonic acid | | X | X | X |
| Water content, grams | 1,450 | 1,400 | 1,350 | 1,300 |
| Percent strength | 100 | 120 | 140 | 160 |
| Consistency (20 sec.), flow cone reading | Normal | Normal | Normal | Normal |

It is essential in obtaining the above results that the ingredients in each of the examples are mixed or formulated in the manner described. It was found, for example, that it is essential to add the nonionic dispersant, i.e., aliphatic substituted unsaturated diol, to the water prior to the addition of the other ingredients of the composition. If, for example, one or more of the dispersants is added at the same time or as a combination, the results indicated would not be obtained, or, in other words, the amount of water required in each instance to retain normal consistency, would be equivalent to those examples where only one dispersant was added.

Thus, in accordance with this invention, by dosing the water initially with a non-ionic dispersant, without any other dispersant additions, a 50 gram deduction in the amount of water ordinarily required and a 20 percent increase in strength was obtained. Further, when the mixture was treated by adding the nonionic dispersant initially, followed by the addition of the cement, etc., and then subsequently by adding the lignosulfonate dispersant, a decrease of 100 grams of water was obtained with an increase in strength of 40 percent. Upon the further addition of the lignosulfonate, or the separate addition of all three, as illustrated in Example IV, the amount of water was reduced by 150 grams in comparison to Example I, which contained no dispersants, and the strength was increased three-fold over the increase of Example II, or by 60 percent. It should be noted, also, that the consistency of each example was normal, even though some of the examples contained lesser amounts of water, as indicated in Example IV. Thus, ordinarily, while expecting the consistency to vary with the amount of water, it was found that it remained constant as the water was decreased and the number of dispersants was increased from one to three.

While it is preferred to use the nonionic or acetylenic diol as the initial dispersant, followed by the addition of the cationic and/or anionic, i.e., amines, sulfonates, and lignosulfonates, it is possible to obtain the same results by initially using one or more of the other dispersants in place of the diol, as long as they are added to the mixture in series and not as a combination of dispersants.

The dispersants or water-reducing agents referred to for purposes of this invention include the nonionic compounds which are water soluble, and are the reaction products of either an aromatic or an aliphatic alcohol with several moles of an epoxide, such as ethylene or propylene oxide. These polyoxy alkylene glycol ethers include such compounds as polyethylene glycol ether of octylphenol, polyethylene glycol ether of alkylphenol, or polypropylene glycol ether of octylphenol. In addition to the glycol ethers, preferred dispersants are the aliphatic substituted ditertiary butyne and octyne diols or glycols, wherein the aliphatic substituents contain from 1 to about 18 carbon atoms. The lower alkyl substituted unsaturated diols or ditertiary acetylenic glycols exhibit excellent dispersing properties and are unique in that they indicate a strong synergistic combination with other dispersants.

The amount of nonionic dispersants, and particularly the diols, will vary depending on the composition of the cement or grout, but in most instances will range from about 0.001 to 1.0 percent by weight of the water used in each mixture. However, when more than one dispersant is to be used in the composition, the amount of nonionic dispersants can be reduced. For all practical purposes, amounts as low as 0.001 to 0.1 percent by weight of the water were found to be sufficient.

The cationic dispersants are characterized by having a hydrophobic group which forms the cation in aqueous solution. Cationic materials include the amines and the quaternary ammonium compounds, which constitute the largest group of cationic dispersants. Ordinarily, when a cationic and anionic dispersant are brought together in an aqueous medium, there is a tendency for them to precipitate due to the high molecular weight ionizable salts of the anion and cation. However, in instances where the anion and cation are at the lower end of the hydrophobic range, the salts are soluble and may display sufficient dispersing activity.

The anionic dispersants include the sulfonates of unsubstituted aromatic hydrocarbons, such as benzene, naphthalene, phenol, diphenyl, etc. These compounds exhibit little, if any, dispersing properties; however, upon substituting an aliphatic, cycloaliphatic, or aralkyl side chain for one or more of the hydrogen atoms, the compounds will obtain characteristics of a dispersing agent, provided the substituent is sufficiently large. Some of the aromatic dispersing agents include the propylated naphthalene sulfonates which are particularly useful as dispersing or solubilizing agents for high molecular weight compounds. In addition to these, the butylated naphthalene sulfonates are more widely used in that they are more effective at lower concentrations due to their slightly higher molecular weights. In addition to the alkyl naphthalene sulfonates, higher molecular weight compounds, such as the mono- and diamyl naphthalene sulfonates also may be used. As the molecular weight of the alkyl group increases, it may be necessary to limit the product to one alkyl substituent rather than a plurality of groups since this is sufficient to impart surface activity to the compound. On the other hand, if the lower alkyl substituted naphthalene sulfonates are used, it is necessary to use more than one substituent in order to impart a reasonable degree of activity. Thus, for example, the dibutyl naphthalene sulfonates display more activity than the monobutyl sulfonates. On the other hand, mixed alkyl substituents, or where one of the alkyl groups is propyl and the other butyl, display even a higher degree of activity. Other lower aromatic sulfonates include the di- and trialkyl benzenes and alkyl toluene sulfonates, wherein the alkyl group may be either butyl or amyl, etc.

Again, it should be noted that the larger the aromatic nucleus the greater the increase in the activity of the sulfonate, as can be exemplified by comparing dipropyl benzene with dipropyl methylene. The butylated diphenyl sulfonates and phenyl-phenol sulfonates are particularly good dispersants. Specific examples of these compounds include the monobutyl diphenyl sodium sulfonate, the monobutyl phenyl-phenol sodium sulfonate, and the dibutyl phenyl sodium sulfonates. The amount of cationic or anionic dispersant to be used in the compositions will vary depending upon the ingredients and may range from about 0.01 to 4.0 percent, preferably 0.05 to 2.0 percent, by weight of the Portland cement and/or other cementitious component in each mixture. However, where more than one dispersant is to be used, smaller percentages of the cationic and/or anionic dispersant may be used. In addition to the nonionic dispersants, i.e., the diols, and the cationic and/or anionic dispersants, i.e., amine or alkyl aryl sulfonates, a third and essential dispersant includes the alkali and alkaline earth metal salts of lignosulfonic acid and various derivatives thereof, which, when use with the other anionic, cationic, and nonionic dispersants, is responsible for reducing materially the amount of water which ordinarily would be required in preparing these mixtures. Of the various derivatives of the lignosulfonates, the amine-modified calcium lignosulfonates are preferred. The lignosulfonate is added to the concrete or similar mixtures in the same proportions as the other dispersants, for example 0.01 to 4.0 percent by weight, and, likewise, may be used in smaller proportions, i.e., 0.05 to 2.0 percent by weight, in those instances where three or more dispersants are to be used in the same composition in the manner described.

The following examples comprising about 24 percent by weight of Portland cement, about 12 percent by weight of flyash and about 48 percent by weight of sand, illustrate the type of cementitious compositions which exhibit water-reducing qualities by the addition of one or more dispersing agents in accordance with this invention. The amount of water added in these examples ranges from about 15 to 18 percent by weight, depending upon the number of dispersing agents added and the amount thereof.

*Example I*

| | Parts by weight |
|---|---|
| Portland cement | 2,000 |
| Flyash (Chicago) | 1,000 |
| Grouting sand | 4,000 |
| Water (sufficient for 20 sec. consistency grout) | 1,450 |

*Example II*

| | |
|---|---|
| Portland cement | 2,000 |
| Flyash (Chicago) | 1,000 |
| Grouting sand | 4,000 |
| Water (sufficient for 20 sec. consistency grout) | 1,400 |
| Sodium lignosulfonate (0.25 percent by weight of the cement and flyash). | |

*Example III*

| | |
|---|---|
| Portland cement | 2,000 |
| Flyash (Chicago) | 1,000 |
| Grouting sand | 4,000 |
| Water (sufficient for 20 sec. consistency grout) | 1,350 |
| Nonionic aliphatic substituted butyne diol (0.1 percent of the water). | |
| Sodium lignosulfonate (0.25 percent by weight of the cement and flyash). | |

*Example IV*

| | |
|---|---|
| Portland cement | 2,000 |
| Flyash (Chicago) | 1,000 |
| Grouting sand | 4,000 |
| Water (sufficient for 20 sec. consistency grout) | 1,300 |
| Nonionic aliphatic substituted butyne diol (0.1 percent by weight of the water). | |
| Dibutyl phenyl sodium sulfonate (0.25 percent by weight of the cement and flyash). | |
| Sodium ilgnosulfonate (0.25 percent by weight of the cement and flyash). | |

In each of the above examples, sufficient water was added to the mixtures until a 20 sec. consistency was obtained, as measured in a standard flow cone (CRD–C79). It is illustrated by these examples that where no dispersant was used, the amount of water required was 1,450 parts by weight in comparison to the mixture of Example IV where three surfactants were used and the amount of water was decreased to 1,300 parts by weight. Thus, by adding one or more dispersants in series in the manner described, the amount of water required is reduced materially in comparison to mixtures containing no dispersant. Accordingly, from the data obtained from the examples, it was discovered that a normal consistency could be obtained with smaller amounts of water by the addition of at least two and preferably three dispersants. Moreover, quite unexpectedly, the addition of a plurality of dispersants resulted in improving the ultimate compression and tensile strength of the finished product by 60 percent in instances where three dispersants were used.

The method employed in preparing the compositions of this invention is essential, however, to ultimate success. It is important in preparing the composition that each of the dispersants be added separately or in series, and not all at the same time. It was found that if the dispersants were added together the results would be no better than that obtained in mixtures where only a single dispersant was used. Accordingly, in preparing the grout composition of Example III, the water was first mixed with the non-ionic dispersant, then added to the cement, flyash, and sand, and thoroughly mixed with the aqueous dispersant until all of the ingredients were wetted thoroughly. The length of mixing time will depend on the batch size, but it is important that mixing be continued until all of the ingredients are wetted adequately by the aqueous mixture. Following agitation of these ingredients, the lignosulfonate was added with further agitation, and it was noticed immediately that there was a considerable reduction in the consistency. The reduction was almost twice as great when the lignosulfonate was used in series with the nonionic glycol in comparison to the use of the nonionic glycol alone. The compositions without the dispersants required 1,450 parts by weight of water before a 20 sec. flow cone consistency was obtained, whereas the instant example achieved the same consistency with only 1350 parts by weight of water. Still more important was the fact that the mixture containing two dispersants provided a 40 percent increase in strength over the composition containing no dispersants and the composition containing only the lignosulfonate dispersant displayed an ultimate strength which was 20 percent greater than the composition containing no dispersant. Further, where three of the dispersants were used in series, the ultimate strength was increased by 60 percent over the composition having none of the dispersants.

The composition of Example IV, which contained three dispersants, was prepared by dosing the water initially with the nonionic glycol dispersant and subsequently adding the cement, flyash, and sand, while mixing thoroughly. After the composition had been agitated thoroughly, the anionic sulfonate dispersant was added with agitation and immediately the consistency of the composition was lowered. The decrease in consistency here was in the same degree as that experienced in adding the second dispersant to the composition, as recited in the preparation of Example III. Upon the addition of the lignosulfonate, after several minutes of agitation, there was a still further decrease in consistency. The water reduction here is approximately three times that of Example II where only one, i.e., the lignosulfonate, was used as the dispersant.

A concrete was prepared by following the method of Example IV, except that the flyash was eliminated. A mixture of the sand, cement, and water was brought to a certain consistency by the addition of the dispersants in the manner described. To this mixture a suitable quantity of properly graded coarse aggregate was added with agitation until a mixture of proper consistency was obtained.

In addition to the method by which the compositions are prepared, it was found that in order to obtain optimum improvement both in water reduction and ultimate strength, it is important to use dispersants, one from each class, or at least one of the dispersants must be selected from a class different from the other dispersants. Thus, for example, the dispersing or water reducing agents known are classified as a nonionic, cationic, or anionic, and by using one or more from each of these classes, or at least one nonionic and a combination of one or more cationic and/or anionic dispersants, wherein at least one of the latter is a lignosulfonic acid or the salt thereof, the improvements described can be obtained.

While the theory of using dispersants from different classes, or at least two each from a different class, is not completely understood, it is believed to be due to the fact that each of these dispersants displays a different degree of reactivity or dispersibility. Thus, if an anion, for example, is in solution with a cation, rather than a nonionic dispersant will not be affected by the presence of either a cation or an anion. Moreover, by having a nonionic dispersant present with a cation and/or anion, a synergistic effect is obtained which cannot be obtained by the use of either one of the dispersants alone, or if they are all selected from the same class. When the nonionic, anionic, and cationic dipersants, or combinations thereof, are added to the cementitious compositions, the mixture takes on a more liquefied or fluid appearance but, nevertheless, maintains a consistency or "slump" which is on a par with equivalent mixtures containing larger amounts of water.

Typical examples of the effect that water or the water-cement ratio has on a concrete mixture is illustrated in the following table:

TABLE II

| Water-cement ratio: | Compressive strength, p.s.i. |
| --- | --- |
| 0.80 | 2,350 |
| 0.75 | 3,150 |
| 0.70 | 4,000 |
| 0.65 | 4,800 |
| 0.60 | 5,650 |

As illustrated in the above table, as the ratio of water to cement decreased from 0.80 to 0.60, the strength of the composition increased from 2,350 p.s.i. to 5,650 p.s.i.

The foregoing detailed description is given merely by way of illustration and it should be understood that variations can be made without departing from the true spirit or scope of the invention.

The invention claimed is:
1. A composition consisting essentially of 20 to 40 percent by weight of Portland cement, 0 to 20 percent by weight of pozzolana material, 40 to 70 percent by weight of aggregate, 10 to 25 percent by weight of water, and from 0.001 to 1.0 percent, based upon the weight of the water, of a lower aliphatic substituted acetylenic glycol, from 0.01 to 4.0 percent, by weight of the cement, of an alkyl aryl metal sulfonate, and from 0.01 to 4.0 percent, by weight of the cement, of a metal salt of lignosulfonic acid, said lower aliphatic substituted acetylenic glycol, said alkyl aryl metal sulfonate, and said metal salt of lignosulfonic acid being separately and serially added with agitation between each addition.

2. A composition consisting essentially of approximately 24 percent by weight of Portland cement, 12 percent by weight of flyash, 48 percent by weight of sand, 15 to 18 percent by weight of water, and effective amounts of three dispersing agents, one selected from each of the groups consisting of (1) a lower aliphatic substituted acetylenic glycol; (2) alkyl aryl metal sulfonate; and (3) a metal salt of lignosulfonic acid, the effective amount of the lower aliphatic substituted acetylenic glycol ranging from 0.001 to 1.0 percent by weight of the water, and the effective amount of each of the other two dispersing agents ranging from 0.01 to 4.0 percent by weight of the cement, said three dispersing agents being added separately and serially with agitation between each addition 3. The composition of claim 2 further characterized in that the lower aliphatic substituted acetylenic glycol is butyne glycol.

4. A method of preparing a siliceous cementitious composition which comprises adding an effective amount of a nonionic dispersing agent to water, said effective amount of said nonionic dispersing agent ranging from 0.001 to 1.0 percent by weight of water, mixing said aqueous solution with 20 to 40 percent by weight of Portland cement, 0 to 20 percent by weight of pozzolana material, 40 to 70 percent by weight of aggregate, and agitating said mixture with the serial addition of from 0.01 to 4.0 percent, by weight of the cement, of at least one dispersing agent selected from the group consisting of alkyl aryl metal sulfonates, metal salts of lignosulfonic acid, and mixtures thereof.

5. The method of claim 4 further characterized in that the nonionic dispersing agent is an aliphatic substituted acetylenic glycol.

6. The method of claim 5 further characterized in that one of the dispersing agents is an alkaline earth metal salt of lignosulfonic acid added separately to the mixture.

7. The method of claim 4 further characterized in that the aggregate is sand.

8. A method of preparing a siliceous cementitious composition which comprises the addition of from 0.001 to 1.0 percent by weight of a lower aliphatic substituted acetylenic glycol to 10 to 20 percent by weight of water, mixing said aqueous solution with 20 to 40 percent by weight of Portland cement, from 0 to 20 percent by weight of pozzolana material, 40 to 70 percent by weight of aggregates, and agitating said mixture with the separate and serial addition of from 0.01 to 4.0 percent by weight of the cement of an alkyl aryl metal sulfonate and from 0.01 to 4.0 percent by weight of the cement of an alkali metal salt of lignosulfonic acid, with continuous mixing to obtain normal consistency.

9. The method of claim 8 further characterized in that the pozzolana material is flyash and the aggregate is sand.

10. The method of claim 9 further characterized in that the lower aliphatic substituted acetylenic glycol is butyne glycol.

11. A method of preparing a siliceous cementitious composition which comprises the addition of an effective amount of a nonionic dispersing agent to approximately 15 to 18 percent by weight of water said effective amount ranging from 0.001 to 1.0 percent by weight of the water, then adding said aqueous mixture with agitation to approximately 24 percent by weight of Portland cement, 12 percent by weight of flyash, and 48 percent by weight of sand, and subsequently serially adding with agitation from 0.01 to 4.0 percent by weight of the cement at least two additional dispersing agents selected from the group consisting of alkyl aryl and aryl alkyl sulfonates, metal salts of lignosulfonic acid, and mixtures thereof.

12. A method of preparing a siliceous cementitious composition which contains approximately 15 to 18 percent by weight of water, comprising the addition to said water of from 0.001 to 1.0 percent by weight of the water of a nonionic dispersing agent selected from the group consisting of lower aliphatic substituted acetylenic glycols and polyoxyalkylene glycol ethers; adding said aqueous mixture to approximately 24 percent by weight of Portland cement, 12 percent by weight of flyash, 48 percent by weight of sand, with agitation, and subsequently adding separately and serially to said wet mixture from 0.01 to 4.0 percent by weight of the cement of a metal sulfonate selected from the group consisting of alkyl aryl and aralkyl sulfonates, lignosulfonate, and mixtures thereof, with agitation, to obtain a composition of normal consistency.

13. A method of preparing concrete and grout compositions that contain approximately 15 to 18 percent by weight of water, comprising the addition to said water of from 0.001 to 1.0 percent by weight of the water of an aliphatic substituted acetylenic glycol and mixing said aqueous mixture with approximately 24 percent by weight of Portland cement, 12 percent by weight of flyash, 48 percent by weight of sand, with agitation; subsequently adding to said wet mixture from 0.01 to 4.0 percent by weight of the cement of a metal sulfonate selected from the group consisting of alkyl aryl and aralkyl sulfonates and lignosulfonates; said lignosulfonate added to the wet mixture separately with agitation to obtain a mixture of normal consistency.

References Cited by the Examiner

UNITED STATES PATENTS

| | | | |
|---|---|---|---|
| 2,141,569 | 12/1938 | Tucker et al. | 106—90 |
| 2,307,741 | 1/1943 | Goldstein et al. | 106—90 |
| 2,800,963 | 7/1957 | Roberts et al. | 106—90 |
| 2,927,033 | 3/1960 | Benedict et al. | 106—90 |
| 2,965,678 | 12/1960 | Sundberg et al. | 106—90 |
| 3,008,843 | 11/1961 | Jolly | 106—90 |
| 3,022,824 | 2/1962 | Binkley et al. | 106—90 |

TOBIAS E. LEVOW, *Primary Examiner.*